R. CARLSTEDT.
SHAFT COUPLING.
APPLICATION FILED FEB. 16, 1920.
1,338,122. Patented Apr. 27, 1920.
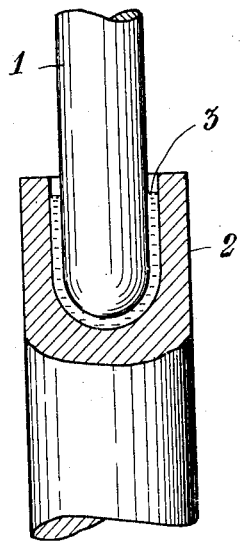
Inventor
R. Carlstedt,
By H. R. Kerslake
Attorney

UNITED STATES PATENT OFFICE.

RAGNAR CARLSTEDT, OF STOCKHOLM, SWEDEN.

SHAFT-COUPLING.

1,338,122.  Specification of Letters Patent.  Patented Apr. 27, 1920.

Application filed February 16, 1920. Serial No. 359,176.

*To all whom it may concern:*

Be it known that I, RAGNAR CARLSTEDT, subject of the King of Sweden, residing at Stockholm, Sweden, have invented certain new and useful Improvements in Shaft-Couplings, of which the following is a specification.

Small electric motors directly coupled for instance to a fan are generally started without a starting resistance, and this results in a considerable rush of current taking place at the moment of switching in on account of the inertia of the rotating parts and the resistive action of the load.

The present invention has for its purpose to produce a yielding shaft coupling which renders an instantaneous switching in of the motor to full voltage possible without at the same time giving rise to an undue rush of current.

In its simplest form the invention consists of two parts rotating together with their respective shafts, and an intermediate viscous or plastic body or liquid with sufficient molecular friction to enable power to be transmitted from the driving to the driven shaft, substantially by the frictional action of the intermediate body or liquid.

An embodiment of the invention is illustrated in the accompanying drawing, in which 1 and 2 designate the two shafts which are supposed to be journaled vertically above one another, the upper shaft 1 extending with its lower end into a correspondingly shaped recess in the lower shaft 2, without, however, touching the latter. The space 3 between the shafts contains a more or less viscous or slow-running or plastic body, for instance a viscous oil. Provided the load is not too great, the rotation of the driven shaft is effected by the driving shaft by means of the friction between the oil and the shafts.

What I claim as new and desire to secure by Letters Patent of the United States is:—

A shaft coupling including in combination, a pair of alining driving and driven shaft sections one end of one of which is rounded while the adjacent end of the other section is recessed to receive the rounded end, and a plastic body in the recess and interposed between said sections and having sufficient molecular friction to effect transmission of power from the driving to the driven shaft section.

In testimony whereof I affix my signature in presence of two witnesses.

RAGNAR CARLSTEDT.

Witnesses:
OSCAR GRAHN,
JACOB BAGGE.